United States Patent [19]
Halter

[11] 3,907,528
[45] Sept. 23, 1975

[54] WATER SEPARATOR SILENCER

[75] Inventor: Edmund John Halter, Irving, Tex.

[73] Assignee: Burgess Industries Incorporated, Dallas, Tex.

[22] Filed: Dec. 26, 1973

[21] Appl. No.: 427,586

[52] U.S. Cl. ............... 55/276; 55/418; 55/459; 181/47 B; 181/58
[51] Int. Cl.² ..................... B01D 45/12
[58] Field of Search ........... 55/276, 337, 418, 459, 55/DIG. 21, DIG. 30, 278; 181/46, 56, 58, 47 R, 47 B, 57; 210/512 R

[56] References Cited
UNITED STATES PATENTS

| | | | |
|---|---|---|---|
| 2,073,218 | 3/1937 | Mordt | 55/DIG. 21 |
| 2,295,101 | 9/1942 | Dunham | 55/459 |
| 2,404,263 | 7/1946 | Wilson et al. | 55/459 X |
| 2,672,215 | 3/1954 | Schmid | 210/512 R UX |
| 2,838,132 | 6/1958 | Markham et al. | 55/276 |
| 3,177,972 | 4/1965 | Wirt | 181/56 |
| 3,545,179 | 12/1970 | Nelson et al. | 55/276 |
| 3,584,439 | 6/1971 | Gronholz | 55/337 |
| 3,778,984 | 12/1973 | Lawser | 55/459 X |

FOREIGN PATENTS OR APPLICATIONS

| | | | |
|---|---|---|---|
| 354,608 | 8/1931 | United Kingdom | 55/459 |

*Primary Examiner*—Frank W. Lutter
*Assistant Examiner*—Kathleen J. Prunner
*Attorney, Agent, or Firm*—Darbo, Robertson & Vandenburgh

[57] ABSTRACT

To attenuate noise from the discharges of wet vacuum pumps and blowers, the transition horn connecting the outlet with a centrifugal entrained water separator is provided with spaced flat splitters, preferably ported, to divide the width of the horn interior into a plurality of relatively narrow channels resulting in the reflection of more and transmission of less sound with appreciable dissipation of sound energy. Shell noise is also reduced.

3 Claims, 6 Drawing Figures

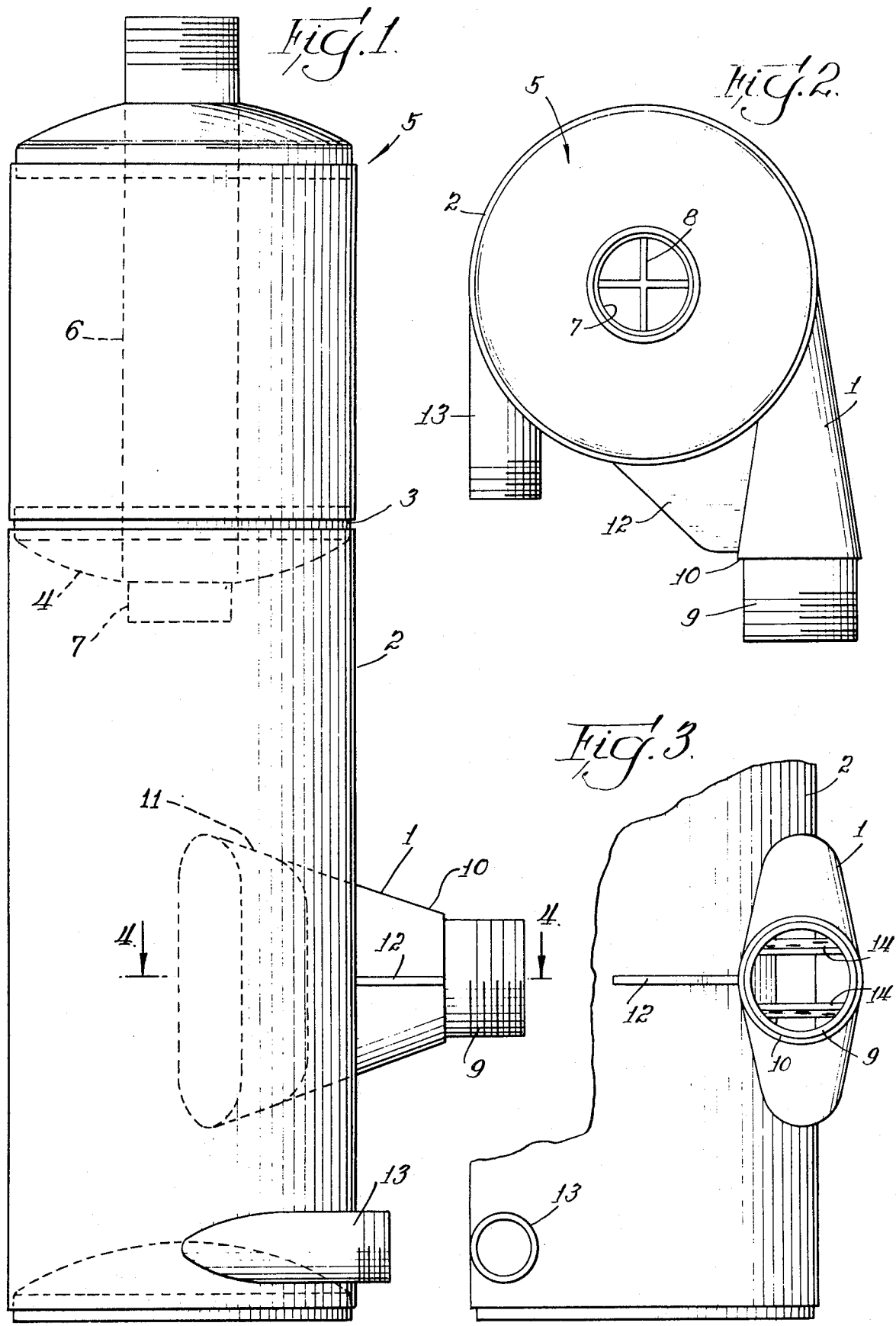

WATER SEPARATOR SILENCER

BACKGROUND AND SUMMARY OF THE INVENTION

Many industrial processes and procedures employ mechanical devices such as Nash pumps, Roots blowers or similar water sealed types of rotary air pumps to provide vacuum conditions. While noise from their intakes usually present no problem, the discharges of these devices are inevitably noisy and the noise generally increases with increasing vacuum load and with increased speed of operation. The air or other gas sucked in by such pumps and blowers may be wet with entrained water or other liquid particles and, since they use water as sealing means, the discharge air streams are loaded with water. It is almost always necessary, at least desirable, to both separate the water from the air and attenuate the noise which would otherwise radiate from the discharges of these pumps.

Various types of separators and various types of silencers or snubbers have heretofore been employed to accomplish these two objectives. The separating and silencing units may be separate and arranged in series in the discharge flow stream or they may be combined into a single unit, still in series. A typical combined unit is a vertical cylindrical housing into which the wet gases are blown tangentially into the lower portion of the housing to separate the entrained water particles from the air and a snubber or other type of silencing device is incorporated in the upper part of the housing for the attenuation of the noise. In a preferred form of separator, the conventional round pipe or conduit leading from the pump outlet is connected with the interior of the separator through a part, herein referred to as a transition horn, the function of which is to change the cross-sectional configuration of the stream from round to flat whereby the liquid-laden gases are discharged at the interior surface of the cylindrical housing in a sheet-like stream to skim around along its surface for the efficient separation of the liquid particles which impinge upon the flow along the surface to the pump and discharge. The swirling gases, relieved on their burden of liquid, move upwardly and flow out through an axial tube for silencing treatment and discharge.

The transition horn is an undesirably efficient conduit for the sound which emanates from the noisy vacuum pump, posing a relatively difficult silencing problem.

The principal object of the present invention is to provide a spearator having a transition horn which, while serving its intended function with respect to the cross-sectional shape and direction of the stream, prevents the transmission of a substantial part of the noise from the pump by reflecting part back upstream and dissipating a portion of the acoustic energy. A further object is to reduce shell noise radiated from the transition horn and to strengthen the horn structure itself.

DESCRIPTION OF THE DRAWINGS

The invention is described in conjuction with the accompanying drawings wherein:

FIG. 1 is an elevational view showing a combined separator and silencer embodying the invention;

FIG. 2 is a top view of the unit of FIG. 1;

FIG. 3 is a side view of the bottom portion of the unit of FIG. 1;

DESCRIPTION OF SPECIFIC EMBODIMENT

Figure 4:
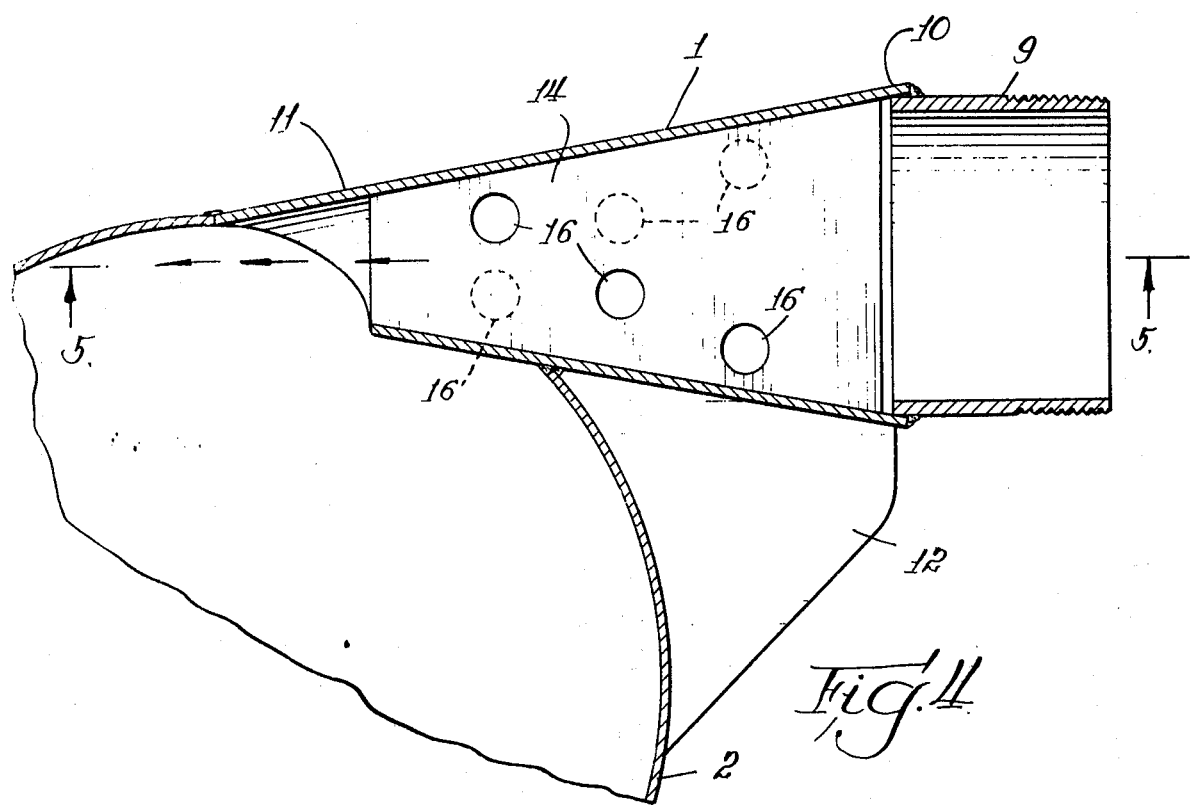
FIG. 4 is a cross-sectional view taken at the line 4 — 4 of FIG. 1.

Except for the construction of transition horn 1, the arrangement and structure of the combined separator and silencer illustrated in FIGS. 1–5 is known and typical of the combined units for the service above described. It comprises a cylindrical housing or shell 2 which, for convenience in manufacture, is formed from two parts welded at their adjoining ends to the flange 3 of a partition 4 which serves as one end of a silencer unit 5 which, in this particular example, comprises a perforated open-ended tube 6 surrounded by a suitable sound absorbing material packed in the space between the tube and the shell. A short section of unperforated tube 7 extends a short distance below partition 4 for the reception of liquid-free gases at the axis of the unit. Flow straightening vanes 8 are usually provided to convert the swirling flow to axial flow as the gases pass from the separator section to the silencer section.

A threaded inlet snout 9 is welded to the circular inlet end 10 of the horn. The horn, itself, flares progressively from the round inlet 10 to the narrow elliptical outlet 11. The transition horn passes through an opening provided for it in shell 2 and is welded to the shell. Gusset 12 welded to the horn and the shell provides added strength. The transition horn is oriented in such a way that the wet air stream, narrowed down by the described flaring of the horn, introduces the gases tangentially into the housing 2 in a sheet-like stream.

A liquid discharge pipe 13 is provided at the bottom of the unit.

Figure 5:
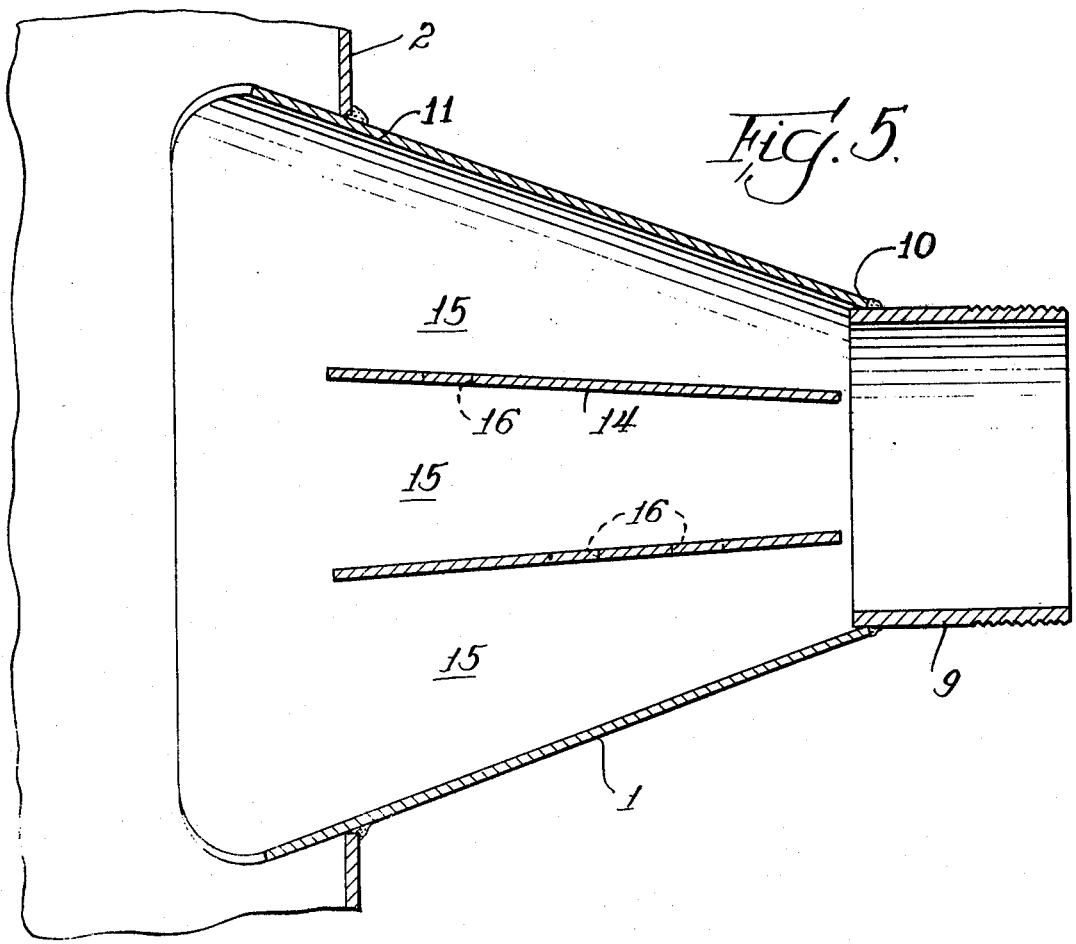
FIG. 5 is a cross-sectional view taken at the line 5 — 5 of FIG. 4.

In accordance with the invention, a plurality of splitters 14 are arranged and welded or otherwise secured within horn 1 to divide the passageway defined by the horn into a plurality of channels 15 the totality of which comprise the entire horn passageway. As is best seen in FIG. 5, channels 15 are open at both ends and splitters 14 are generally in line with the air stream so that they offer no substantial interference with the flow of the gases through the transition horn. Being arranged substantially normal to the axis of housing 2, the splitters divide the stream widthwise, preserving the integrity of thickness of the stream as it impinges upon the cylindrical walls of the housing.

The intended and actual primary function of splitters 14 is acoustical. By dividing the horn passageway with its relatively large cross section into a plurality of relatively narrow channels, the transition horn is converted from a relatively efficient sound transmitter to an acoustic device which effects the reflection of a substantial part of the vacuum pump noise back upstream and effects the dissipation of a portion of the sound energy. By providing a limited number of ports 16 in the splitters, limited flow between channels caused by acoustic pressure differentials is permitted with resulting dissipation of sound energy.

The described reflection of noise back upstream toward the vacuum pump results from the reduction of the cross-sectional dimensions of the passageways through which the sound must be transmitted. It is known that the transmission of sound from a duct into a larger space is proportional to the ratio of the effective duct diameter to the wave length of the sound. The smaller this ratio, the less sound is transmitted out from the duct and the more sound is reflected. Thus, for a given wave length, by providing the plurality of narrower channels, the amount of noise transmitted from the pump is reduced.

While theoretically the greatest number of spaced splitters with resulting greatest number of narrower channels provides the best acoustical effect in that the greatest amount of noise would be reflected, the number of splitters employed is limited by practical considerations. In smaller units, such as that illustrated, two splitters are sufficient whereas larger sizes may justify the use of three or four.

The ports in the splitters are preferably offset in adjacent splitters for optimum acoustical effect. They may be offset lengthwise as well as widthwise. The arrangement shown in the drawing provides the practical advantage of the use of a single splitter construction with opposite orientation to provide offset ports.

The side edges of splitters 14 are preferably welded to the relatively flat surfaces of horn 1. This not only gives greater strength to the structure but also eliminates the tendency of the relatively flat surfaces of the horn to vibrate and thus radiate so-called shell noise.

ACHIEVEMENT

Figure 6:
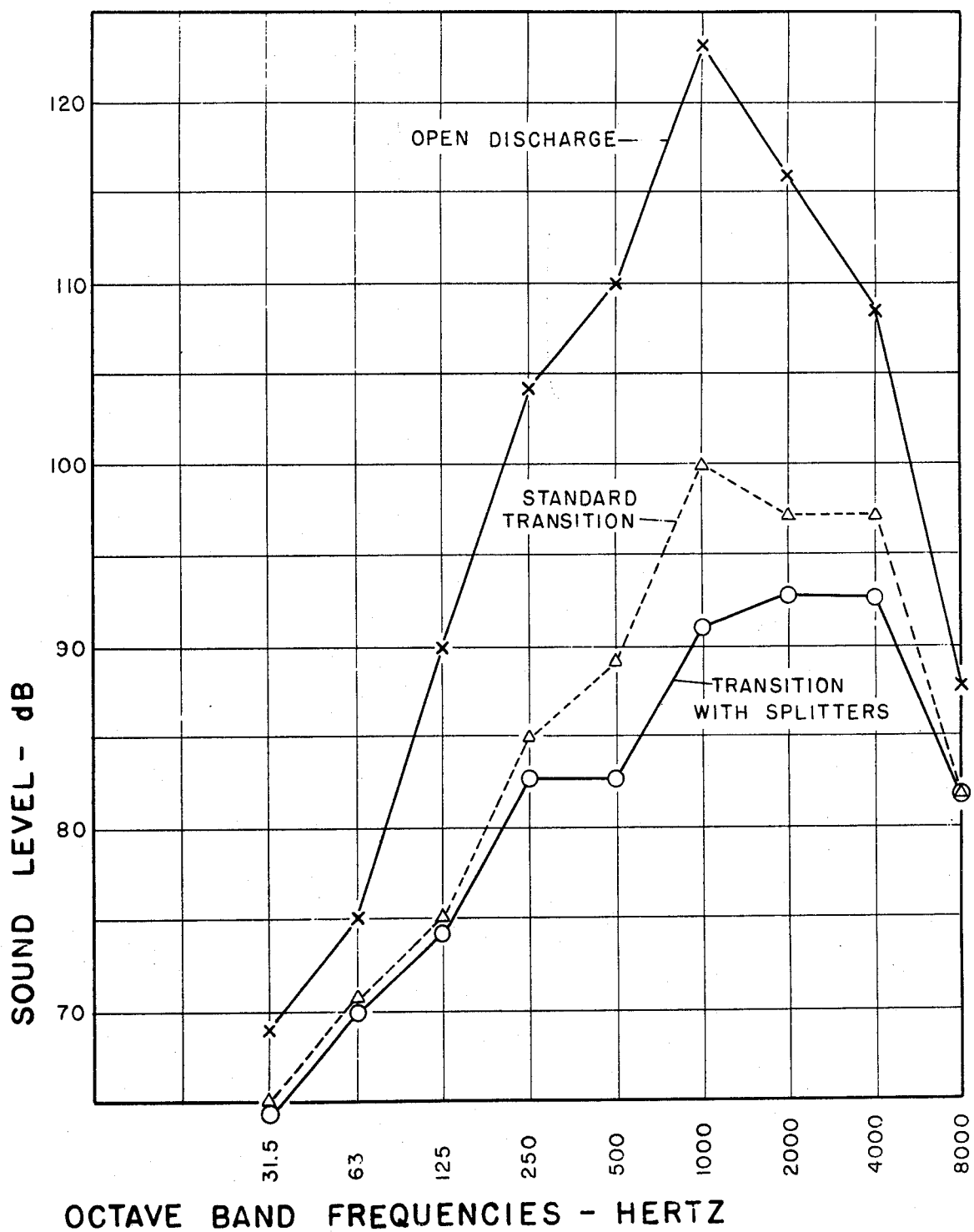
FIG. 6 is a graph showing sound levels under conditions herein pertinent and specified over a range of frequencies.

The acoustical improvement achieved by the invention is graphically represented in FIG. 6. The sound level at the open discharge of a Roots blower operated at a given speed is represented by the "open discharge" graph. The sound level at the outlet of the known form of separator having a standard transition horn with the Roots blower operating at the same speed is represented by the "standard transition" graph. The sound absorbing material was not incorporated in the test unit in order that the acoustical characteristics of the separator with transition horn would be shown most clearly. The improvement resulting from the invention herein described is shown in the "transition with splitters" graph, all conditions being the same as those giving the "standard transition" results except that the splitters are employed in the transition horn.

It is thus seen that a substantial improvement is effected by the device of this invention in that vacuum pumps and blowers may be operated with less objectionable noise or a simpler silencing device may be employed to achieve the desired degree of silencing.

I claim:

1. A combined water separator and silencer for treating a gaseous stream comprising a vertical cylindrical housing defining an empty separaring chamber and having an outlet at the top and a water discharge at the bottom of said chamber, an inlet transition horn having a circular inlet end and opposed broad sides tapering toward an oval discharge end secured to and opening tangentially into said separator chamber to discharge gases flowing therethrough as a sheet-like stream tangential throughout its width to the interior surface of said cylindrical housing, and a plurality of spaced flat splitters each being oriented substantially normal to the axis of said housing and extending between the opposed broad sides of said transition horn to divide the inlet passageway defined by said horn widthwise into a plurality of channels.

2. Structure in accordance with claim 1 wherein the splitters are ported.

3. Structure in accordance with claim 1 wherein each splitter has a plurality of ports therein and the ports of adjacent splitters are offset relative to each other.

* * * * *

UNITED STATES PATENT AND TRADEMARK OFFICE
CERTIFICATE OF CORRECTION

PATENT NO. : 3,907,528
DATED : September 23, 1975
INVENTOR(S) : Edmund John Halter It is certified that error appears in the above-identified patent and that said Letters Patent are hereby corrected as shown below:

| | |
|---|---|
| Col. 1, l. 40 | before surface "its'" should read --this-- |
| Col. 1, l. 42 | before flow change "the" to --and-- |
| Col. 1, l. 43 | after relieved "on" should be --of-- |
| Col. 1, l. 51 | "spearator" should be --separator-- |
| Col. 2, l. 22 | before 7 "tube" should be --tubing-- |
| Col. 4, l. 17 | after empty "separaring" should be --separating-- |

Signed and Sealed this sixteenth Day of December 1975

[SEAL]

Attest:

RUTH C. MASON
*Attesting Officer*

C. MARSHALL DANN
*Commissioner of Patents and Trademarks*